United States Patent
Tremelling et al.

(10) Patent No.: US 11,670,924 B2
(45) Date of Patent: Jun. 6, 2023

(54) FITTING CONNECTIONS FOR CORROSION RESISTANT ELECTRICAL CONDUITS

(71) Applicant: ABB Schweiz AG, Baden (CH)

(72) Inventors: Darren Tremelling, Raleigh, NC (US); Sheng Zhong, Raleigh, NC (US); Elio Perigo, Raleigh, NC (US); Daniel Pierce Armstrong, Raleigh, NC (US); Marius Rutkevičius, Raleigh, NC (US)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/508,919

(22) Filed: Oct. 22, 2021

(65) Prior Publication Data

US 2023/0126637 A1    Apr. 27, 2023

(51) Int. Cl.
*H02G 3/06* (2006.01)
*H02G 3/04* (2006.01)

(52) U.S. Cl.
CPC ............. *H02G 3/06* (2013.01); *H02G 3/0462* (2013.01)

(58) Field of Classification Search
CPC ............................... H02G 3/06; H02G 3/0462
USPC ........................................................ 174/68.3
See application file for complete search history.

(56) References Cited

U.S. PATENT DOCUMENTS

| | | | |
|---|---|---|---|
| 7,078,623 B1 | 7/2006 | Sheehan | |
| 7,696,435 B1 | 4/2010 | Thomas et al. | |
| 9,705,295 B1 | 7/2017 | Smith | |
| 10,056,746 B1 | 8/2018 | Smith | |
| 2008/0110660 A1 | 5/2008 | Bolante | |
| 2014/0007407 A1 | 1/2014 | Firestine | |
| 2018/0175544 A1 | 6/2018 | Williams et al. | |
| 2019/0211948 A1 | 7/2019 | West et al. | |
| 2019/0323637 A1 | 10/2019 | Kiely et al. | |
| 2019/0379190 A1 | 12/2019 | Morse et al. | |
| 2020/0224807 A1* | 7/2020 | Melni | F16L 37/101 |

FOREIGN PATENT DOCUMENTS

| | | |
|---|---|---|
| CN | 108841102 A | 11/2018 |
| CN | 109294107 A | 2/2019 |
| DE | 2020-12012856 U1 | 2/2014 |
| JP | 2003164035 A | 6/2003 |
| JP | 2003166681 A | 6/2003 |
| JP | 2003176308 A | 6/2003 |
| JP | 2004248379 A | 9/2004 |
| JP | 2006005988 A | 1/2006 |
| JP | 2012039838 A | 2/2012 |
| JP | 2013233040 A | 11/2013 |
| JP | 2013236452 A | 11/2013 |
| JP | 2014121107 A | 6/2014 |
| JP | 2015208056 A | 11/2015 |
| JP | 2018046631 A | 3/2018 |

(Continued)

*Primary Examiner* — Timothy J Thompson
*Assistant Examiner* — Michael F McAllister
(74) *Attorney, Agent, or Firm* — Greenberg Traurig, LLP

(57) ABSTRACT

A push-lock coupler includes an annular metal insert with a coaxial profile complementary to a conduit; a cylindrical polymeric housing molded over the annular metal insert and having a first and second end and an inner surface; and wherein the first and second end are capable of deforming to the coaxial profile of the conduit inserted into either the first or second end, and the inner surface of the cylindrical polymeric housing has at least one groove disposed between the annular metal insert and the first end.

20 Claims, 4 Drawing Sheets

(56) References Cited

FOREIGN PATENT DOCUMENTS

| | | | |
|---|---|---|---|
| JP | 2018135972 | A | 8/2018 |
| JP | 2018-157678 | A | 10/2018 |
| JP | 2018157677 | A | 10/2018 |
| KR | 100912672 | B1 | 8/2009 |
| KR | 101797719 | B1 | 11/2017 |
| WO | 2016-120919 | A1 | 8/2016 |

\* cited by examiner

FITTING CONNECTIONS FOR CORROSION RESISTANT ELECTRICAL CONDUITS

FIELD

This disclosure relates generally to mechanical and electrical connections. More particularly, this disclosure relates to corrosion resistant connections for electrical conduits such as, but not limited to, electrical power distribution systems.

BACKGROUND

Electrical conduits are utilized in virtually all industrial and commercial segments. For flexibility in corrosion prone locations, multi-material tubular constructions of varied sizes and lengths are employed, which are then threaded, bent, and installed. The multi-material tubular constructions are typically a metal core with an organic coating(s). Interface components (e.g., fittings/couplers) for electrical components must possess both mechanical stiffness and electrical continuity. Consequently, interface components typically rely on threading or a set screw to connect. Current interface components typically provide sealed interfaces in metallic conduits via implementing O-rings, adhesives, set screws, or other additional material.

SUMMARY

In some embodiments, the push-lock coupler includes an annular metal insert; and a cylindrical polymeric housing over-molded over the annular metal insert, the cylindrical polymeric housing having a first end, a second end, and at least one groove, the at least one groove being disposed on an inner surface of the cylindrical polymeric housing; and the annular metal insert being disposed in the recess and having an inner coaxial profile complementary to an electrical conduit, the first and second end being capable of deforming to the coaxial profile of the electrical conduit inserted into the first or second end, and the at least one groove being disposed between the annular metal insert and the first end.

In some embodiments, the inner surface of the cylindrical polymeric housing further includes a second groove, the second groove disposed between the annular metal insert and the second end.

In some embodiments, the first and the second groove of the cylindrical polymeric housing has a profile complementary to a protrusion on an outer surface of the electrical conduit to mechanically lock with the electrical conduit when inserted into the cylindrical polymeric housing.

In some embodiments, the cylindrical polymeric housing provides a sealing function when the electrical conduit is inserted into the first end or the second end due to mechanical locking with a protrusion of the electrical conduit and the mating of the electrical conduit to the annular metal insert.

In some embodiments, the inner surface of the cylindrical polymeric housing further includes a recess to retain the annular metal insert.

In some embodiments, an outer surface of the push-lock coupler is smooth and has no sharp edges or contours.

In some embodiments, a profile angle of the first end and the second end of the cylindrical polymeric housing extending from the annular metal insert adds significant extraction strength to the push-lock coupler.

In some embodiments, the annular metal insert further includes an undulating interior surface.

In some embodiments, the undulating interior surface of the annular metal insert is a knurled surface.

In some embodiments, the knurled surface of the annular metal insert has 25 teeth per inch.

In some embodiments, the knurled surface of the annular metal insert has 50 teeth per inch.

In some embodiments, the cylindrical polymeric housing is an injectable and extrudable thermoplastic material included of polyolefins, polyvinyl chloride (PVC), polyetherimide (PEI), polyphenylene sulfide (PPS), polyether ether ketone (PEEK), polyphthalamide (PPA), polyoxymethylene (POM), phenoformaldehyd (PF), unsaturated polyester (UP), polyurethane (PUR and PU), polyimide, polyamide, polyvinyl alcohol, polyvinylidene chloride, polyacrylonitrile and polyalkylene paraoxybenzoate, or other suitable thermoplastic material.

In some embodiments, the cylindrical polymeric housing is a polymeric composite with fibers included of carbon fiber, glass, wool, silk, cotton, rayon, cellulose, cellulose acetate, flax, ramie, jute, aramid fibers, or other suitable material.

In some embodiments, the annular metal insert is made of aluminum, iron, or other alloy.

In some embodiments, a method of using a push-lock coupler on an electrical conduit includes inserting a first electrical conduit into a first end of a cylindrical polymeric housing until an exterior surface of the first electrical conduit mates with an interior surface of an annular metal insert centrally disposed in the cylindrical polymeric housing; and inserting a second electrical conduit into the second end of the cylindrical polymeric housing until an exterior surface of the second electrical conduit mates with the interior surface of the annular metal insert.

In some embodiments, inserting the first and second electrical conduit into the first or second end includes mechanically locking a protrusion on the first and second electrical conduit to a groove disposed on an inner surface of the first and second end.

In some embodiments, a fitting connection system includes a cylindrical coupler with a first end and a second end, the cylindrical coupler having a smooth outer surface and capable of receiving an electrical conduit by assuming a coaxial profile of the electrical conduit; and a metal ring centrally disposed inside the cylindrical coupler, wherein an inner surface of the metal ring has a coaxial profile similar to the electrical conduit; wherein the cylindrical coupler and metal ring mechanically lock to the electrical conduit.

In some embodiments, the cylindrical coupler further includes a first groove disposed between the first end and the metal ring and a second groove disposed between the second end and the metal ring.

In some embodiments, the cylindrical coupler has a recess to retain the metal ring.

In some embodiments, the inner surface of the metal ring further includes an undulating surface.

In some embodiments, the undulating surface of the metal ring is a knurled surface.

In some embodiments, a conduit includes a cylindrical housing. In some embodiments, the cylindrical housing includes a conductive inner material. In some embodiments, the conductive inner material is configured to be deformable in response to a compressive force. In some embodiments, the cylindrical housing includes a corrosion resistant outer material. In some embodiments, the corrosion resistant outer material surrounds the conductive inner material. In some embodiments, the cylindrical housing includes a smooth portion and a threaded portion. In some embodiments, the threaded portion extends from the smooth portion to an end of the conduit.

In some embodiments, the conductive inner material is aluminum.

In some embodiments, the corrosion resistant outer material comprises an injectable and extrudable thermoplastic material comprised of polyolefins, polyvinyl chloride (PVC), polyetherimide (PEI), polyphenylene sulfide (PPS), polyether ether ketone (PEEK), polyphthalamide (PPA), polyoxymethylene (POM), phenoformaldehyd (PF), unsatured polyester (UP), polyurethane (PUR and PU), polyimide, polyamide, polyvinyl alcohol, polyvinylidene chloride, polyacrylonitrile and polyalkylene paraoxybenzoate, or any combination thereof.

In some embodiments, the corrosion resistant outer material comprises a polymeric composite with fibers comprised of carbon fiber, glass, wool, silk, cotton, rayon, cellulose, cellulose acetate, flax, ramie, jute, aramid fibers, or other suitable material.

BRIEF DESCRIPTION OF THE DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION

Embodiments of this disclosure are directed to conduit connections. More specifically, the connections described in this disclosure are corrosion resistant fitting connection for electrical conduits commonly used in multilayer tubing construction. The fitting connection includes a metallic core and a deformable polymeric layer that provides a sealed interface with sufficient mechanical stiffness and electrical continuity.

A "conduit" or "electrical conduit" as used herein, includes a tubular body used to protect and route electrical wiring outdoors, in a building, or other structure. In some embodiments, the electrical conduit may be multi-material tubular constructions typically made of a metal core with an organic coating—of varied sizes, lengths, types, and mechanical stiffness. In some embodiments, the electrical conduit may be waterproof or submersible and can also be used to shield sensitive circuits from electromagnetic interference.

A "conduit coupler" as used herein, includes a device capable of connecting two ends of electrical conduits. The conduit coupler may be constructed of a metal core with a polymer housing molded over the metal core—of varied sizes. In some embodiments, the conduit coupler provides intrinsic sealing due to the geometric matching of the coupler to conduit profiles. In some embodiments, the conduit coupler can provide enhanced mechanical locking with a final pulling force well above the standard requirement without degradation due to corrosion and vibration.

Figure 1:
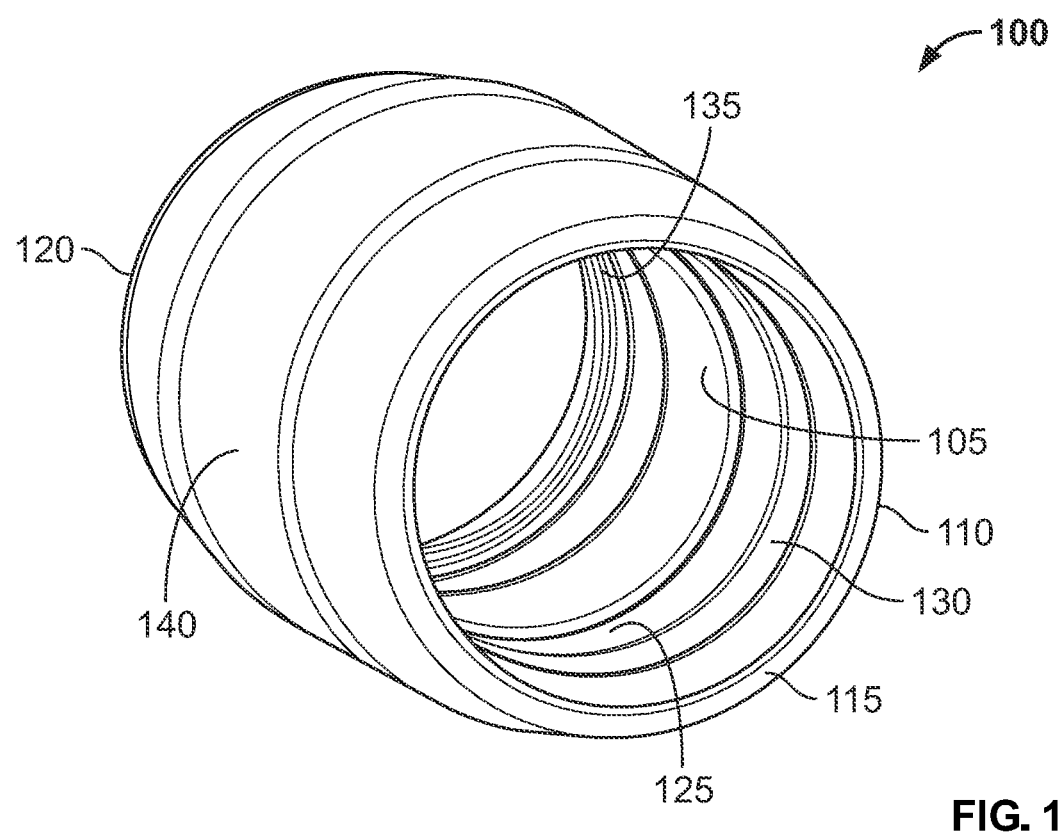
FIG. 1 depicts a perspective view of a conduit coupler, according to some embodiments.

FIG. 1 is a perspective view of a conduit coupler 100, according to some embodiments. The conduit coupler 100 is generally configured to connect two ends of electrical conduit together.

In some embodiments, the conduit coupler 100 includes an annular metal insert 105 and a cylindrical polymeric housing 110. In some embodiments, the cylindrical polymeric housing 110 can be molded over the annular metal insert 105. The cylindrical polymeric housing 110 has a first end 115, a second end 120, and an inner surface 125. In some embodiments, the cylindrical polymeric housing 110 includes at least one groove 130 located on the inner surface 125 of the cylindrical polymeric housing 110 between the annular metal insert 105 and the first end 115. In some embodiments, the annular metal insert 105 can be made of aluminum, iron, alloys thereof, or any combination thereof.

In some embodiments, the conduit coupler 100 is configured to receive an end of an electrical conduit that is inserted into one of the first end 115 or the second end 120 of the cylindrical polymeric housing 110 until the electrical conduit mates with the respective half of the annular metal insert 105. Accordingly, in some embodiments, the electrical conduit that is inserted into the conduit coupler 100 may have a protrusion on the outer body of the electrical conduit that engages the at least one groove 130 of the conduit coupler 100, thereby mechanically locking the conduit coupler 100 with the electrical conduit body.

In some embodiments, the at least one groove 130 on the inner surface 125 of the cylindrical polymeric housing 110 may have a profile that complements the protrusion of the electrical conduit. The at least one groove 130 dimensions, and angles present, may be designed so that once the electrical conduit is installed into the conduit coupler 100, the interface is not only locked into place, via push-fit, but sealed against the external environment.

In some embodiments, the cylindrical polymeric housing 110 may include a second groove 135 located between the annular metal insert 105 and the second end 120. The second groove 135 is also configured to receive the protrusion of the electrical conduit. Therefore, when the electrical conduit is inserted into the conduit coupler 100, the protrusion of the electrical conduit mechanically locks with second groove 135 of the conduit coupler 100. In some embodiments, the second groove 135 on the inner surface 125 of the cylindrical polymeric housing 110 may have a profile that matches the protrusion of the electrical conduit. The second groove 135 dimensions, and angles present, may be designed so that once the electrical conduit is installed into the conduit coupler 100, the interface is not only locked into place, via push-fit, but sealed against the external environment.

In some embodiments, the conduit coupler 100 may be symmetrical about a plane extending through the annular metal insert 105 (e.g., a plane that is perpendicular to a longitudinal axis of the annular metal insert 105).

In some embodiments, the first end 115 and the second end 120 may be tapered to promote easy installation of an electrical conduit into the cylindrical polymeric housing 110 of the conduit coupler 100. The cylindrical polymeric housing 110 may be tapered in such a way that the inner coaxial profile of the inner surface 125 of the cylindrical polymeric housing 110 may be smaller than the coaxial profile of the cylindrical polymeric housing 110 at the first end 115 or the second end 120.

The conduit coupler 100 follows a tubular structure profile to provide installation cleanliness. Furthermore, the exterior surface 140 of the cylindrical polymeric housing 110 may be smooth with no sharp edges or contours, presenting an installation and washdown-friendly design. The cylindrical polymeric housing 110 may be mechanically compliant to deform to the coaxial profile of the structure onto which it will be installed onto. For example, the cylindrical polymeric housing 110 may deform to the coaxial profile of an electrical conduit that is inserted into either the first end 115 or the second end 120 of the conduit coupler 100. In addition, the cylindrical polymeric housing 110 may provide an intrinsic sealing function due to the geometric matching of conduit coupler 100 profile to the electrical conduit profile. Consequently, the mechanical locking of the at least one groove 130 to the protrusion of the electrical conduit, in combination with the mechanically compliant cylindrical polymeric housing 110 that can deform over the outer profile of the electrical conduit provides excellent corrosion resistance and sealing in harsh environmental conditions. Moreover, the cylindrical polymeric housing 110 may be configured to deform during installation without fracturing, or splitting, and once fully installed, the conduit coupler 100 may sustain pull force thresholds described in Table 1 below.

TABLE 1

| Size | Material | Installation Force (lbf) | Extraction Force (lbf) | Standard Requirement (lbf) |
| --- | --- | --- | --- | --- |
| 3/4" | TPU | ~30 | 75~85 | 450 |
|  | Nylon | 180~225 | 454 |  |
|  | (HD)PE | 110~135 | ~500 |  |
| 1" | 25 knurling | 670~900 | ~600 | 600 |
|  | 30 knurling | 225~360 | 12~35 |  |
|  | 50 knurling | ~900 | 550~780 |  |

In some embodiments, the conduit coupler 100 can provide even greater corrosion resistance and sealing in harsh environmental conditions as a result of the combination of the mechanical locking of the at least one groove 130 with the protrusion of the electrical conduit, the geometric matching of conduit coupler 100 profile to the electrical conduit profile, combined with the sealing function of the annular metal insert 105 when an end of the electrical conduit is inserted into the annular metal insert 105 as described below.

In some embodiments, the materials selected for the cylindrical polymeric housing 110 may vary depending on market segment needs. For example, the cylindrical polymeric housing 110 may consist of thermoplastics using injection molding, thermosets using compression molding, transfer molding and potting, or other materials. Examples of materials that may be used include one or more polymer composite materials, including but not limited to polyolefins, such as polypropylene, polyethylene, low density polyethylene, high density polyethylene, acetal and ketal based polymers and copolymers, polyesters (e.g. polyethylene terephthalate, polybutylene terephthalate), polycarbonate, polystyrene, polyether sulfone (PESU), polyphenylene sulfone (PPSU), polysulfone, and polytetrafluoroethylene (PTFE). Other polymers may also be implemented, including but not limited to polyvinyl chloride (PVC), polyetherimide (PEI), polyphenylene sulfide (PPS), polyether ether ketone (PEEK), polyphthalamide (PPA), polyoxymethylene (POM), phenoformaldehyd (PF), unsatured polyester (UP), polyurethane (PUR and PU), polyimide, polyamide, polyvinyl alcohol, polyvinylidene chloride, polyacrylonitrile and polyalkylene paraoxybenzoate.

In some embodiments, the polymeric composites may include a variety of types of fibers, including, but not limited to, carbon fiber, glass fiber, wool, silk, cotton, rayon, cellulose, cellulose acetate, flax, ramie, jute and aramid fibers. In some embodiments, additives may be used to improve the qualities of the materials, including but not limited to coloring, UV resistance, antimicrobial capabilities, conductivity, mechanical and thermal stability, chemical resistance, insulation property and flame resistance. The additives may include, but are not limited to, ceramics, alumina, calcium silicate, flame retardants and clays.

Figure 2:
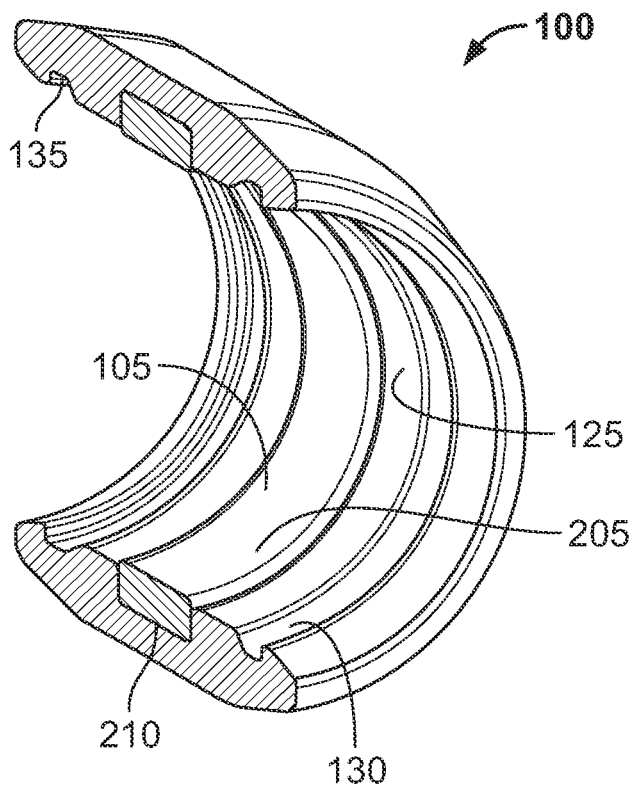
FIG. 2 depicts a cut-away perspective view of the conduit coupler of FIG. 1, according to some embodiments.
Figure 3:
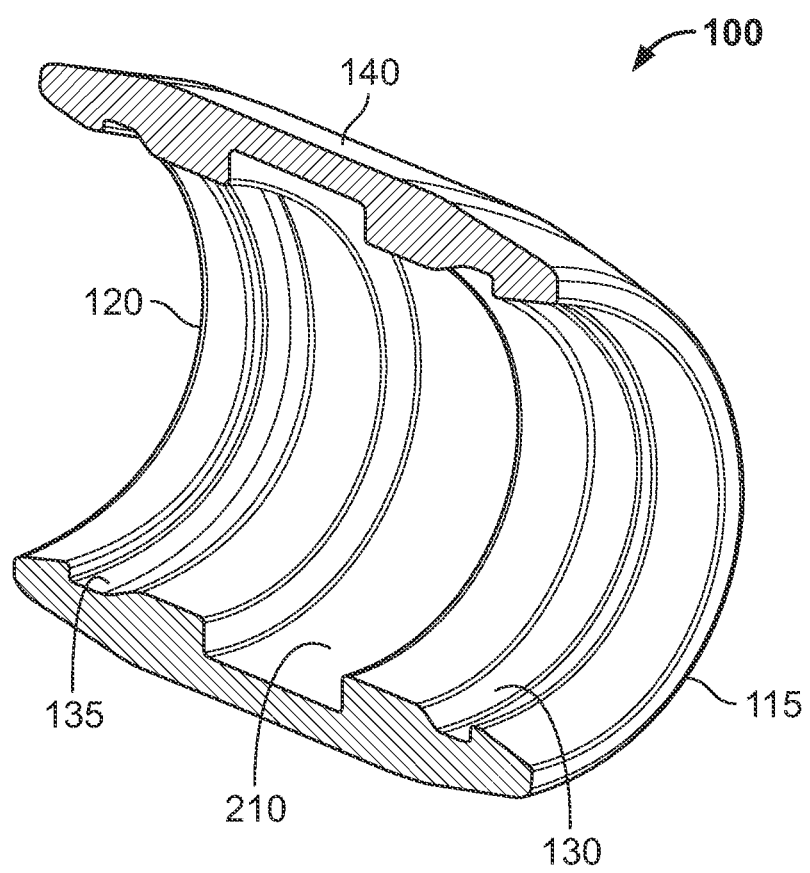
FIG. 3 depicts a cut-away perspective view of the conduit coupler of FIG. 1 without an annular metal insert, according to some embodiments.

FIGS. 2-3 show different views of the components of the conduit coupler 100 of FIG. 1. FIG. 2 depicts a cut-away perspective view of the conduit coupler 100, according to some embodiments. FIG. 3 depicts a cut-away perspective view of the conduit coupler 100 of FIG. 1 without an annular metal insert 105, according to some embodiments. FIGS. 2-3 will be discussed generally unless specific reference is made to a particular figure.

In some embodiments, the cylindrical polymeric housing 110 may have a recess 210 to retain the annular metal insert 105. The recess 210 may be centrally disposed between the first end 115 and the second end 120 of the cylindrical polymeric housing 110 and have a profile similar to the profile of the annular metal insert 105.

In some embodiments, the interior surface 205 of the annular metal insert 105 (FIG. 2) may have a coaxial profile similar to the coaxial profile of the inner surface 125 of the cylindrical polymeric housing 110. In other embodiments, the interior surface 205 of the annular metal insert 105 (FIG. 2) may have a slightly narrower coaxial profile compared to the coaxial profile of the inner surface 125 of the cylindrical polymeric housing 110. Thus, in certain embodiments, the inner diameter of the annular metal insert 105 may be smaller than the inner diameter of the cylindrical polymeric housing 110. The slightly narrower coaxial profile of the interior surface 205 of the annular metal insert 105 (FIG. 2) may assist in ensuring a secure fit of the electrical conduit into the conduit coupler 100 and to ensure the conduit coupler 100 is sealed from the external environment when mated to the electrical conduit.

Figure 4:
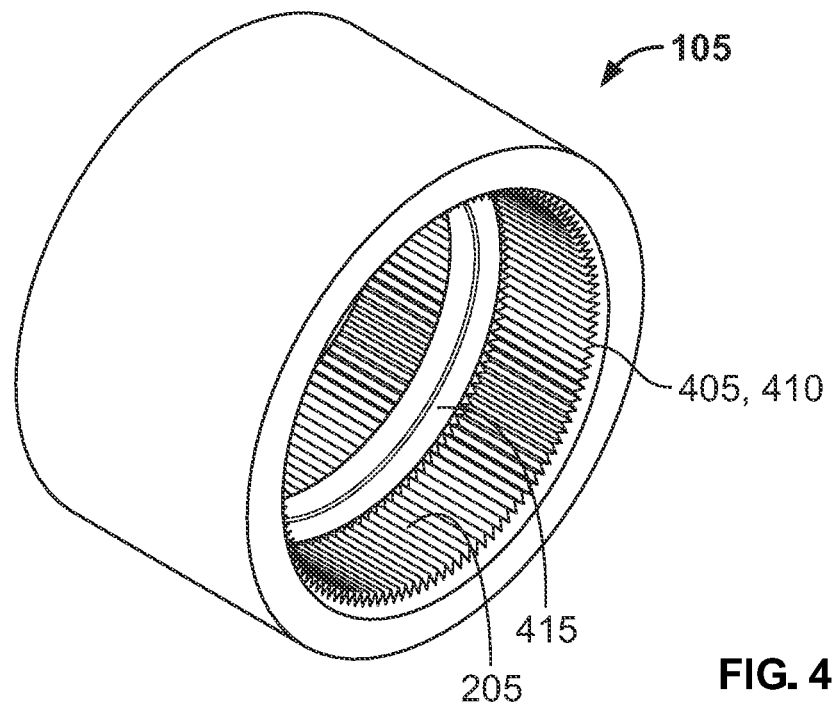
FIG. 4 depicts a perspective view of the annular metal insert of FIG. 1, according to some embodiments.
Figure 5:
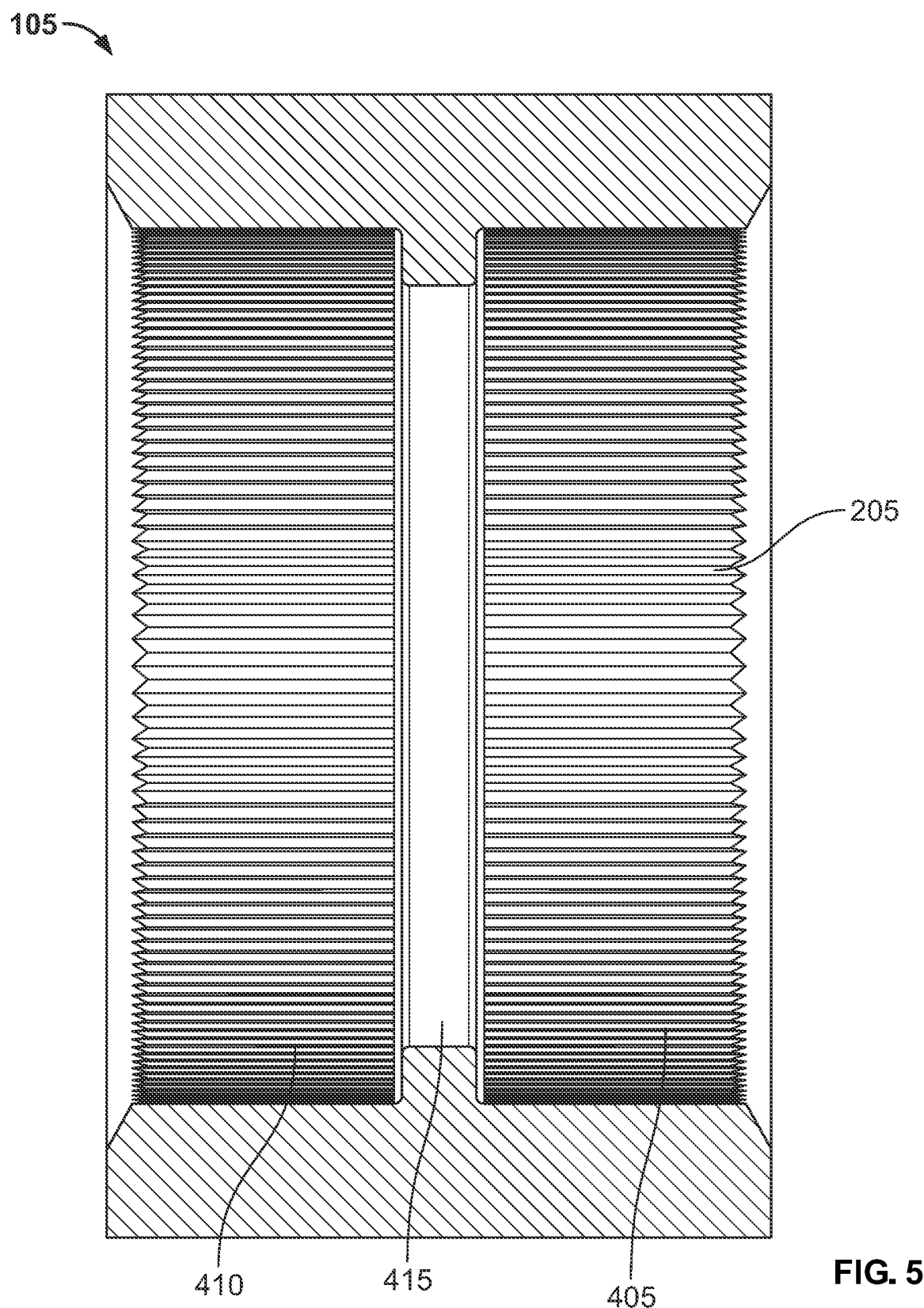
FIG. 5 depicts a side cross-sectional view of the annular metal insert of FIG. 1, according to some embodiments.

FIG. 4-5 show different views of the annular metal insert 105 of FIG. 1. FIG. 4 depicts a perspective view of the annular metal insert 105 of FIG. 1, according to some embodiments. FIG. 5 depicts a side view of the annular metal insert 105 of FIG. 1, according to some embodiments. FIGS. 4-5 will be discussed generally unless specific reference is made to a particular figure. The annular metal insert 105 may have an interior surface 205 configured to receive the end of the electrical conduit. In some embodiments, the interior surface 205 of the annular metal insert 105 may be an undulating surface 405. The undulating surface 405 allows for disturbance of oxide layers on the surface of the electrical conduit and allows for greater variation in geometry to meet standard requirements. In some embodiments, the undulating interior surface may be a knurled surface 410. In some embodiments, the knurled surface 410 can include at least 25 teeth per inch. In some embodiments, the knurled surface 410 can include at least 50 teeth per inch. In some embodiments, the knurled surface 410 can include between 25 to 50 teeth per inch. It is to be appreciated that these numbers are examples and the exact knurling pattern can vary beyond the stated values.

In some embodiments, the annular metal insert 105 may have a circular step 415 centrally located on the interior surface 205. The circular step 415 acts as a center stop for the electrical conduit inserted into the conduit coupler 100. The annular metal insert 105 may have a complementary coaxial profile that allows for relatively easy installation, but due to the profile angle of polymer on the cylindrical polymeric housing 110, significant extraction strength is achieved in the conduit coupler 100.

In some embodiments, the annular metal insert 105 can contribute to the corrosion resistance and sealing in harsh environmental conditions as a result of the electrical conduit being inserted into the annular metal insert 105. When the electrical conduit is inserted into the conduit coupler 100, and consequently engages the annular metal insert 105, the interior surface 205 of the annular metal insert 105 can disturb the oxide layers on the surface of the electrical conduit. For example, the interior surface 205 of the annular metal insert 105 may be an undulating surface 405 or a knurled surface 410. The undulating surface 405 or knurled surface 410 can disturb the oxide layers on the electrical conduit when the electrical conduit is inserted into the conduit coupler 100, thereby at least partially mating the annular metal insert 105 to the electrical conduit.

Figure 6:
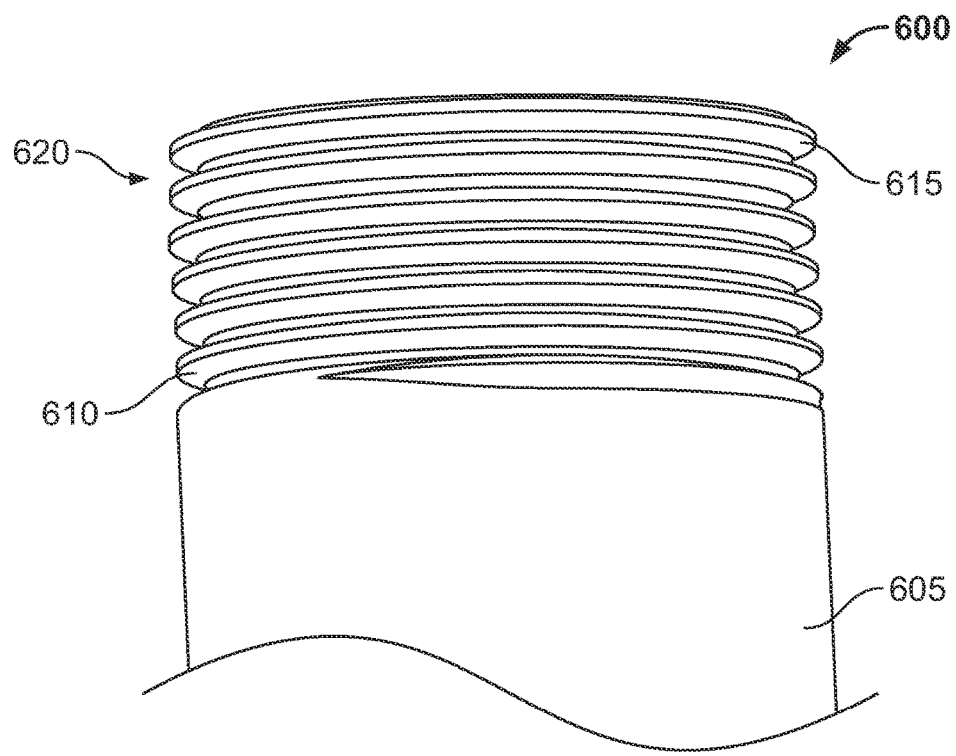
FIG. 6 depicts a side view of a conduit, according to some embodiments.
Figure 7:
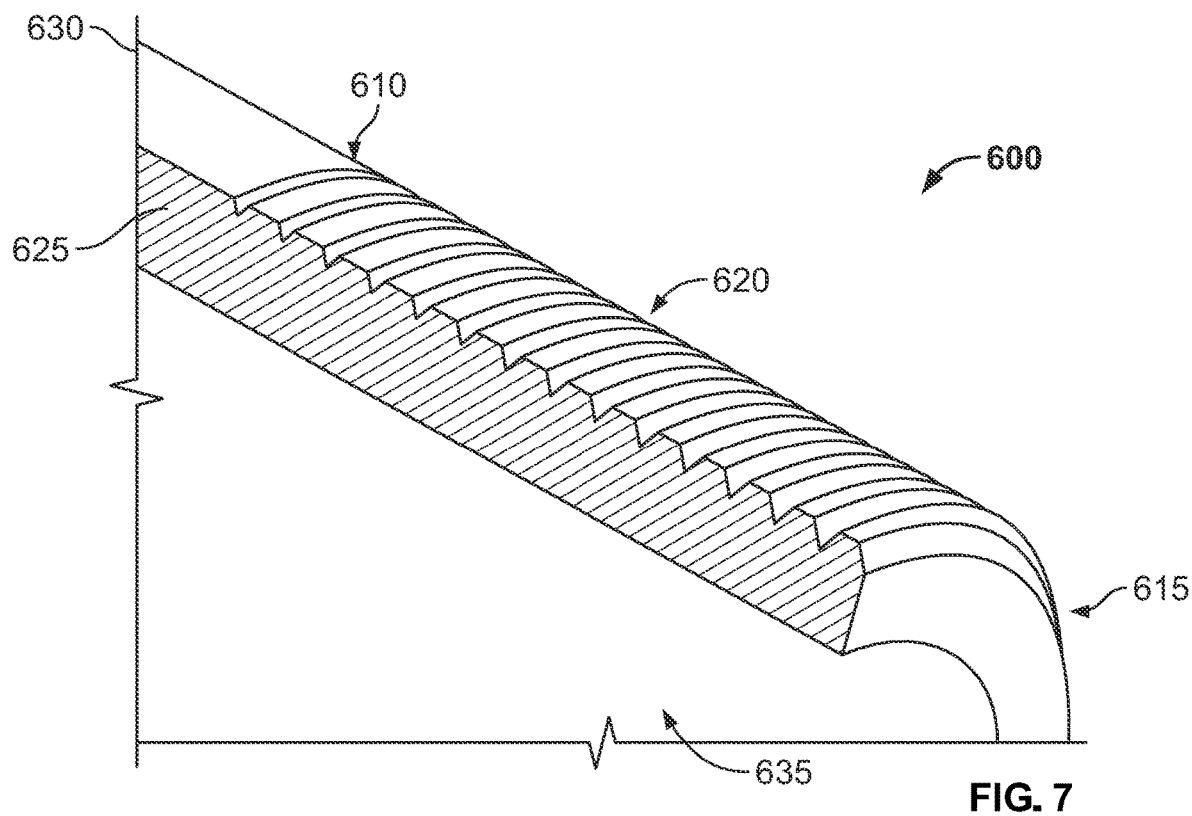
FIG. 7 depicts a perspective sectional view of the conduit of FIG. 6, according to some embodiments.

FIG. 6 depicts a side view of a conduit 600, according to some embodiments. FIG. 7 depicts a perspective sectional view of the conduit 600 of FIG. 6, according to some embodiments. FIGS. 6-7 will be referenced collectively, unless expressly noted otherwise.

The conduit 600 includes a smooth outer portion 605. Extending from a first end 610 to a second end 615 is a threaded portion 620. The second end 615 corresponds to an extent of the conduit 600. A length of the threaded portion 620 can be varied depending upon a number of threads selected, which can be based on, for example, a pull-out strength of the connection when threaded.

The conduit 600 is formed of an inner conduit 625 having a coating 630. In some embodiments, the inner conduit 625 is made of metal. In some embodiments, the metal is aluminum or the like. In some embodiments, the metal is selected to be deformable so that the conduit 600 can deflect when another component is threaded onto the threaded portion 620. The inner conduit 625 includes an inner bore 635.

In some embodiments, the coating 630 is a material configured to provide corrosion protection for the inner conduit 625. In some embodiments, the material can include injectable and extrudable thermoplastic materials.

Examples of suitable materials include, but are not limited to, one or more polymer composite materials, including but not limited to polyolefins, such as polypropylene, polyethylene, low density polyethylene, high density polyethylene, acetal and ketal based polymers and copolymers, polyesters (e.g. polyethylene terephthalate, polybutylene terephthalate), polycarbonate, polystyrene, polyether sulfone (PESU), polyphenylene sulfone (PPSU), polysulfone, and polytetrafluoroethylene (PTFE). In some embodiments, the polymer can include polyvinyl chloride (PVC), polyetherimide (PEI), polyphenylene sulfide (PPS), polyether ether ketone (PEEK), polyphthalamide (PPA), polyoxymethylene (POM), phenoformaldehyd (PF), unsaturated polyester (UP), polyurethane (PUR and PU), polyimide, polyamide, polyvinyl alcohol, polyvinylidene chloride, polyacrylonitrile, polyalkylene paraoxybenzoate, or any combination thereof.

In some embodiments, the polymer is a high density polyethylene (HDPE) polymer.

In some embodiments, the polymer and polymer composites can include a variety of types of fibers, including but not limited to carbon fiber, glass fiber, wool, silk, cotton, rayon, cellulose, cellulose acetate, flax, ramie, jute, aramid fibers, or any combination thereof.

In some embodiments, additives can be used to modify one or more properties of the materials, including but not limited, to UV resistance, antimicrobial, conductivity, mechanical and thermal stability, chemical resistance, insulation, and flammability.

In some embodiments, the additives can include, but are not limited to, ceramics, alumina, calcium silicate, flame retardants, clays, or any combination thereof.

When threading another component onto the threaded portion 620, the corresponding threads compress the conduit 600. Because the inner conduit 625 is made of a deformable metal material, the inner conduit 625 is compressed. As a result, the coating 630 on the threaded portion 620 is also deformed. The deformation of the coating 630 causes the coating 630 to be maintained within the threads of the threaded portion 620. As a result, the coating 630 functions to provide a sealing connection between the conduit 600 and the component being connected to the conduit 600. Thus, the conduit 600 is able to provide a sealed interface (e.g., to protect from contaminants such as dirt, water, or the like) without utilizing an additionally applied adhesive or sealant, which can be cumbersome and messy.

EXAMPLES

Example conduits (Samples 1-6) were created. The examples have a diameter of the inner bore of ¾". Samples 1-2 were not aged. Samples 3-6 were aged in boiling water for at least 200 hours according to the Intertek ETL SEMKO High Temperature $H_2O$ PVC Coating Adhesion Test Procedure. Samples 3-4 were aged prior to being threaded. Samples 5-6 were threaded prior to being aged. Table 2 illustrates pull-out strength values experimentally determined, all exhibiting significant margin over standard requirement for this size.

TABLE 2

| Sample | Pull out strength (lbf) |
|---|---|
| 1 | 1550 |
| 2 | 1575 |
| 3 | 1275 |
| 4 | 1325 |
| 5 | 1450 |
| 6 | 1500 |

[71] As illustrated in the table, the pull out strength for all of Samples 1-6 exceeded the standard requirement of 450 lbf. As expected, the unaged samples (1-2) exhibited the highest pull out strengths. The samples (5-6) which were threaded prior to aging exhibited pull out strengths approaching the unaged samples. The samples (3-4) that were aged prior to being threaded exhibited the lowest pull out strengths, but still exceeded the standard by approximately 3×.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A push-lock coupler comprising:
   an annular metal insert;
   a cylindrical polymeric housing over-molded over the annular metal insert, the cylindrical polymeric housing having a first end, a second end, and at least one groove, the at least one groove being disposed on an inner surface of the cylindrical polymeric housing; and
   the annular metal insert having an inner coaxial profile complementary to an electrical conduit and the first and second end being capable of deforming to the coaxial profile of the electrical conduit inserted into the first or second end, and the at least one groove being disposed between the annular metal insert and the first end.

2. The push-lock coupler of claim 1, wherein the at least one groove is a first groove and the cylindrical polymeric housing further comprises a second groove, the second groove being disposed between the annular metal insert and the second end.

3. The push-lock coupler of claim 2, wherein the first and the second groove of the cylindrical polymeric housing has a profile complementary to a protrusion on an outer surface of the electrical conduit to mechanically lock with the electrical conduit when inserted into the cylindrical polymeric housing.

4. The push-lock coupler of claim 2, wherein the cylindrical polymeric housing provides a sealing function when the electrical conduit is inserted into either the first end or the second end due to mechanical locking of the first or second groove with a protrusion of the electrical conduit and a mating of the electrical conduit to the annular metal insert.

5. The push-lock coupler of claim 1, wherein the inner surface of the cylindrical polymeric housing further comprises a recess to retain the annular metal insert.

6. The push-lock coupler of claim 1, wherein an outer surface of the push-lock coupler is smooth and has no sharp edges or contours.

7. The push-lock coupler of claim 1, wherein a profile angle of the first end and the second end of the cylindrical polymeric housing extending from the annular metal insert adds significant extraction strength to the push-lock coupler.

8. The push-lock coupler of claim 1, wherein the annular metal insert further comprises an undulating interior surface.

9. The push-lock coupler of claim 8, wherein the undulating interior surface of the annular metal insert is a knurled surface.

10. The push-lock coupler of claim 9, wherein the knurled surface of the annular metal insert has 25 teeth per inch.

11. The push-lock coupler of claim 9, wherein the knurled surface of the annular metal insert has 50 teeth per inch.

12. The push-lock coupler of claim 1, wherein the cylindrical polymeric housing is an injectable and extrudable thermoplastic material comprised of polyolefins, polyvinyl chloride (PVC), polyetherimide (PEI), polyphenylene sulfide (PPS), polyether ether ketone (PEEK), polyphthalamide (PPA), polyoxymethylene (POM), phenoformaldehyd (PF), unsatured polyester (UP), polyurethane (PUR and PU), polyimide, polyamide, polyvinyl alcohol, polyvinylidene chloride, polyacrylonitrile and polyalkylene paraoxybenzoate, or other suitable thermoplastic material.

13. The push-lock coupler of claim 12, wherein the cylindrical polymeric housing is a polymeric composite with fibers comprised of carbon fiber, glass, wool, silk, cotton, rayon, cellulose, cellulose acetate, flax, ramie, jute, aramid fibers, or other suitable material.

14. The push-lock coupler of claim 1, wherein the annular metal insert is made of aluminum, iron, alloys thereof, or any combination thereof.

15. A method of using a push-lock coupler on an electrical conduit comprising:
   inserting a first electrical conduit into a first end of a cylindrical polymeric housing until an exterior surface of the first electrical conduit mates with an interior surface of an annular metal insert centrally disposed in the cylindrical polymeric housing; and
   inserting a second electrical conduit into the second end of the cylindrical polymeric housing until an exterior surface of the second electrical conduit mates with the interior surface of the annular metal insert.

16. The method of claim 15, wherein inserting the first and second electrical conduit into the first or second end includes mechanically locking a protrusion on the first and second electrical conduit to a groove disposed on an inner surface of the first and second end.

17. A conduit, comprising:
   a cylindrical housing, comprising:
      a conductive inner material,
         wherein the conductive inner material is configured to be deformable in response to a compressive force;
      a corrosion resistant outer material,
         wherein the corrosion resistant outer material surrounds the conductive inner material; and
      wherein the cylindrical housing includes:
         a smooth portion; and
         a threaded portion,
            wherein the threaded portion extends from the smooth portion to an end of the conduit.

18. The conduit of claim 17, wherein the conductive inner material is aluminum.

19. The conduit of claim 17, wherein the corrosion resistant outer material comprises an injectable and extrudable thermoplastic material comprised of polyolefins, polyvinyl chloride (PVC), polyetherimide (PEI), polyphenylene sulfide (PPS), polyether ether ketone (PEEK), polyphthalamide (PPA), polyoxymethylene (POM), phenoformaldehyd (PF), unsatured polyester (UP), polyurethane (PUR and PU), polyimide, polyamide, polyvinyl alcohol, polyvinylidene chloride, polyacrylonitrile and polyalkylene paraoxybenzoate, or any combination thereof.

20. The conduit of claim 17, wherein the corrosion resistant outer material comprises a polymeric composite with fibers comprised of carbon fiber, glass, wool, silk, cotton, rayon, cellulose, cellulose acetate, flax, ramie, jute, aramid fibers, or other suitable material.

* * * * *